E. M. POTTER.
Seed-Planter.

No. 159,840.

Patented Feb. 16, 1875.

WITNESSES
Robert Everett
E. H. Bates

INVENTOR
Elias M. Potter
Chipman Hosmer & Co
ATTORNEYS

UNITED STATES PATENT OFFICE.

ELIAS MONROE POTTER, OF RUTHERFORD DEPOT, TENNESSEE.

IMPROVEMENT IN SEED-PLANTERS.

Specification forming part of Letters Patent No. 159,840, dated February 16, 1875; application filed October 10, 1874.

*To all whom it may concern:*

Be it known that I, ELIAS MONROE POTTER, of Rutherford Depot, in the county of Gibson and State of Tennessee, have invented a new and valuable Improvement in Seed-Planters; and I do hereby declare that the following is a full, clear, and exact description of the construction and operation of the same, reference being had to the annexed drawings making a part of this specification, and to the letters and figures of reference marked thereon.

Figure 1:
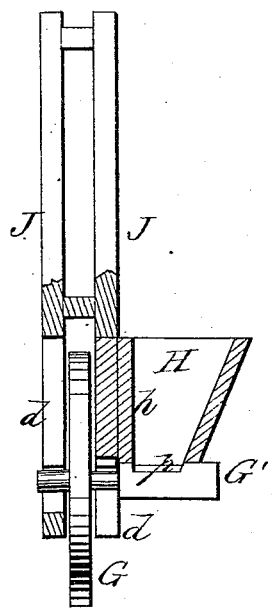
Figure 2:
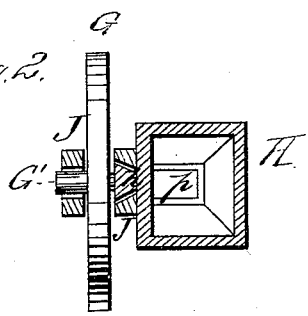

Figure 1 of the drawing is a representation of a vertical sectional view of the hopper, bearing-wheel, and frame. Fig. 2 is a top sectional view of the hopper and bearing-wheel.

This invention has relation to means for planting corn.

The nature of my invention consists in a corn-planting contrivance which is vertically self-adjusting, in combination with opening and covering-plows, as will be hereinafter explained.

In the annexed drawings, G designates a wheel which is keyed on a horizontal axle, G', which latter is free to turn and also to rise and descend in vertical slots $d$ $d'$, which are made in two connected standards, J J. H designates a hopper, which is secured to a dovetail slide, $h$, which is free to rise and descend in the slot $d$ with the wheel and axle. The bottom of the hopper is concave, and rests, by its weight, upon the axle G', fitting this axle so close as to prevent the escape of grains of corn from the sides of the hopper. That portion of the axle which is under the opening through the bottom of the hopper has a pocket, $p$, in it large enough to hold a charge of corn, and during each revolution of the axle one charge of corn is deposited in the ground.

For planting corn I secure a shovel-plow near the front part of the middle beam of the stock on the right-hand side. The standards J J I secure on the left-hand side of said beam in rear of the front plow. In rear of the planter I secure a furrow-plow and a covering-plow.

What I claim as new, and desire to secure by Letters Patent, is—

Wheel G on an axle, G', having a pocket, $p$, in it, in combination with the seed-hopper H and its slide $h$, the whole being applied to standards J for the purpose of accommodating themselves to the inequalities of the ground.

In testimony that I claim the above I have hereunto subscribed my name in the presence of two witnesses.

ELIAS MONROE POTTER.

Witnesses:
F. S. HYDE,
D. F. HALLIBURTON.